(12) United States Patent  
Deguchi et al.

(10) Patent No.: US 9,473,061 B2  
(45) Date of Patent: Oct. 18, 2016

(54) SWITCHED RELUCTANCE MOTOR

(71) Applicants: Jun-ichi Deguchi, Susono (JP);  
Kazuya Arakawa, Fujinomiya (JP);  
Kensuke Yoshizue, Susono (JP);  
Nobukazu Hoshi, Shinjuku-ku (JP);  
Noboru Nakayama, Shinjuku-ku (JP);  
Takuya Iguchi, Shinjuku-ku (JP)

(72) Inventors: Jun-ichi Deguchi, Susono (JP);  
Kazuya Arakawa, Fujinomiya (JP);  
Kensuke Yoshizue, Susono (JP);  
Nobukazu Hoshi, Shinjuku-ku (JP);  
Noboru Nakayama, Shinjuku-ku (JP);  
Takuya Iguchi, Shinjuku-ku (JP)

(73) Assignees: TOYOTA JIDOSHA KABUSHIKI KAISHA, Toyota-shi (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 14/802,138

(22) Filed: Jul. 17, 2015

(65) Prior Publication Data  
US 2016/0043681 A1 Feb. 11, 2016

(30) Foreign Application Priority Data  
Aug. 11, 2014 (JP) .................................. 2014-163909

(51) Int. Cl.  
*H02P 25/08* (2016.01)

(52) U.S. Cl.  
CPC ............. *H02P 25/086* (2013.01); *H02P 25/08* (2013.01); *H02P 25/092* (2016.02)

(58) Field of Classification Search  
CPC ..... H02P 25/092; H02P 25/086; H02P 25/08  
USPC ........................................................ 318/254  
See application file for complete search history.

(56) References Cited

U.S. PATENT DOCUMENTS 6,040,678 A 3/2000 Huh et al.

FOREIGN PATENT DOCUMENTS

| EP | 0145913 A2 | 10/1984 |
|----|------------|---------|
| EP | 1398870 A1 | 3/2004 |
| GB | 2 293 705 A | 4/1996 |
| JP | 8-205581 | 8/1996 |

*Primary Examiner* — Erick Glass  
(74) *Attorney, Agent, or Firm* — Oblon, McClelland, Maier & Neustadt, L.L.P.

(57) ABSTRACT

A switched reluctance motor includes: a stator provided with a plurality of stator teeth as salient poles in a radial fashion with winding wire wound around each of the plurality of stator teeth; a rotor provided with a plurality of rotor teeth as salient poles in a radial fashion; a driving circuit configured to apply a current to the winding wire for each phase; and a control device configured to control the driving circuit, the control device being configured to perform: starting rising of a current to the winding wire of a stator tooth of a phase being a non-excitation target due to stop of energization to the winding wire; and allowing the current applied to the winding wire of the stator tooth of a phase being an excitation target to fall.

7 Claims, 14 Drawing Sheets

SWITCHED RELUCTANCE MOTOR

CROSS-REFERENCE TO RELATED APPLICATION(S)

The present application claims priority to and incorporates by reference the entire contents of Japanese Patent Application No. 2014-163909 filed in Japan on Aug. 11, 2014.

BACKGROUND OF THE INVENTION

1. Field of the Invention

The present invention relates to a switched reluctance motor.

2. Description of the Related Art

A switched reluctance motor including a stator and a rotor each of which is provided with a plurality of salient poles which might be opposed to each other and winding wire wound around the salient pole of the stator is conventionally known. The switched reluctance motor is configured to realize rotational movement of the rotor by magnetic attractive force generated between the salient poles of the stator and the rotor. The switched reluctance motor is disclosed in Japanese Patent Application Laid-open No. 8-205581. The switched reluctance motor of Japanese Patent Application Laid-open No. 8-205581 obtained by winding first coil (winding wire) and second coil (winding wire) around each of the salient poles of the stator gradually changes the magnetic attractive force by delaying the magnitude of a supply current (by duty ratio of rectangular voltage) to one of the first coil and the second coil from on/off of the supply current (by duty ratio of rectangular voltage) to the other of them by arbitrary angle/time. That is to say, the switched reluctance motor decreases noise and vibration by making change in impact generated by the magnetic attractive force gradual by gradually changing the magnetic attractive force.

However, since the conventional switched reluctance motor gradually changes the magnetic attractive force, this deteriorates efficiency while decreasing the noise and vibration. Furthermore, the switched reluctance motor has a room for improvement in the noise and vibration in consideration of mounting on a vehicle.

Therefore, there is a need for a switched reluctance motor capable of inhibiting the noise and vibration while ensuring desired efficiency.

SUMMARY OF THE INVENTION

It is an object of the present invention to at least partially solve the problems in the conventional technology.

According to one aspect of the present invention, there is provided a switched reluctance motor including: a stator provided with a plurality of stator teeth as salient poles in a radial fashion with winding wire wound around each of the plurality of stator teeth; a rotor provided with a plurality of rotor teeth as salient poles in a radial fashion; a driving circuit configured to apply a current to the winding wire for each phase; and a control device configured to control the driving circuit, the control device being configured to perform: starting rising of a current to the winding wire of a stator tooth of a phase being a non-excitation target due to stop of energization to the winding wire at a time a relative distance in a rotational direction of the rotor between the stator tooth of the phase being the non-excitation target and a rotor tooth approaching the stator tooth of the phase being the non-excitation target in the rotational direction becomes not larger than a relative distance between a next rotor tooth preceding the rotor tooth in the rotational direction of the rotor and the stator tooth of the phase being the non-excitation target; and allowing the current applied to the winding wire of the stator tooth of the phase being the excitation target to fall at a time the stator tooth which becomes an excitation target due to the rising of the current and the rotor tooth approaching the stator tooth start opposing to each other in a radial direction and an overlap amount in the rotational direction of the rotor between the stator tooth and the rotor tooth opposing to each other becomes larger than a predetermined amount.

According to another aspect of the present invention, there is provided a switched reluctance motor including: a stator provided with a plurality of stator teeth as salient poles in a radial fashion with winding wire wound around each of the plurality of stator teeth; a rotor provided with a plurality of rotor teeth as salient poles in a radial fashion; a driving circuit configured to apply a current to the winding wire for each phase; and a control device configured to control the driving circuit, the control device being configured to perform: starting rising of the current to the winding wire at a time a change amount of inductance of the winding wire with respect to a change amount of a rotational angle of the rotor changes from a negative value to a positive value; and controlling the current applied to the winding wire such that a product of the change amount of the inductance of the winding wire with respect to the change amount of the rotational angle of the rotor and a rotational speed of the rotor is not smaller than a predetermined value and radial force of magnetic attractive force between the stator tooth and the rotor tooth is not larger than a target value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a switched reluctance motor according to the present invention is hereinafter described in detail with reference to the drawings. Meanwhile, the invention is not limited by the embodiment.

An embodiment of a switched reluctance motor according to the present invention is described with reference to FIGS. 1 to 11.

Figure 1:
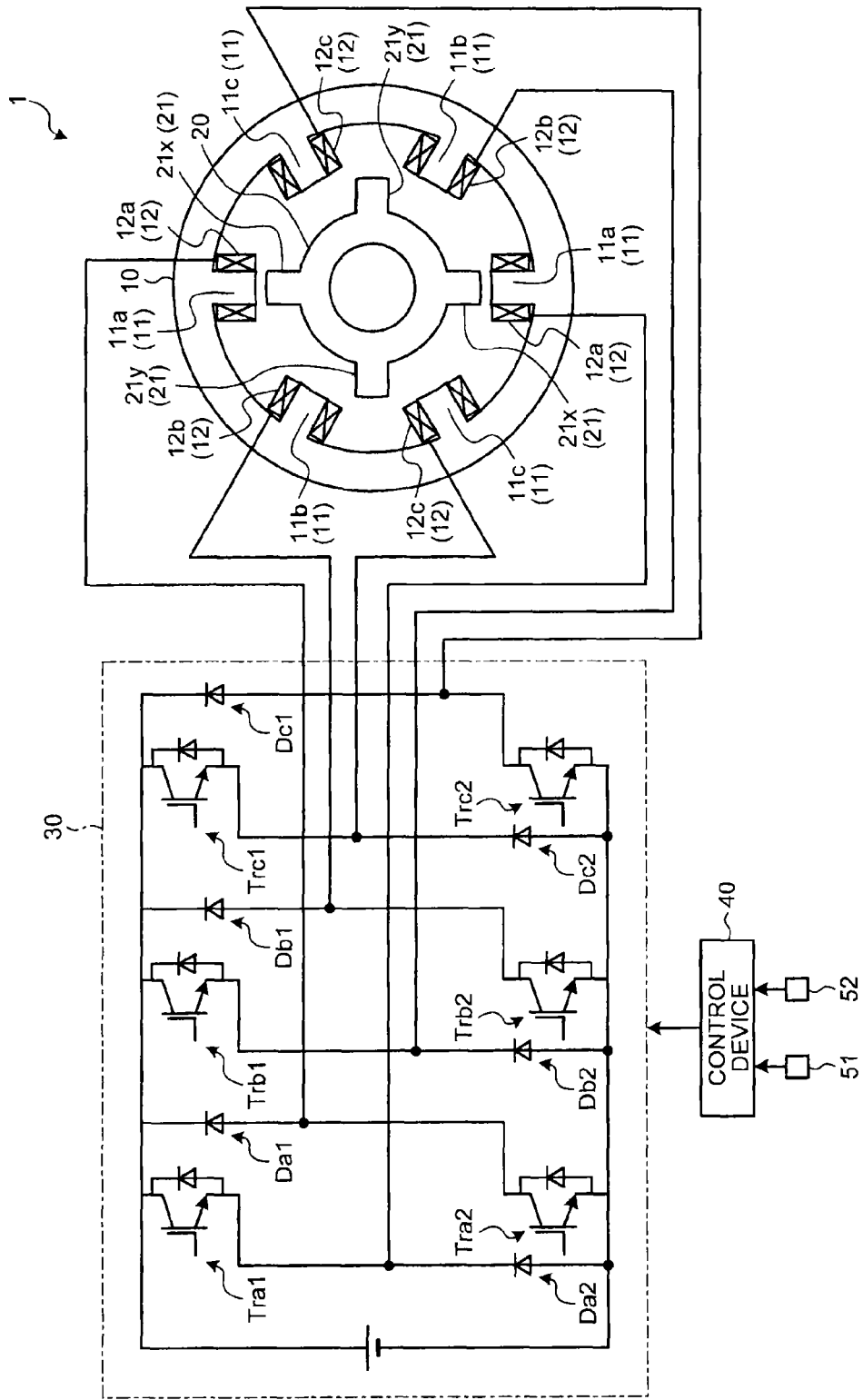
FIG. 1 is a view illustrating a switched reluctance motor of an embodiment and a variation.

A switched reluctance motor (hereinafter, referred to as "SR motor") 1 of this embodiment is provided with a stator 10, a rotor 20, a driving circuit 30, and a control device 40 as illustrated in FIG. 1.

The stator 10 is provided with a plurality of stator teeth 11 as salient poles in a radial fashion on an annular inner peripheral surface. The stator 10 is provided with a plurality of pairs of stator teeth 11 opposed to each other in a radial direction. In the SR motor 1, a pair of stator teeth 11 forms one phase. Furthermore, each stator tooth 11 includes concentrically wound winding wire 12.

The rotor 20 is arranged on an inner side of the stator 10 in the radial direction. The rotor 20 is provided with a plurality of rotor teeth 21 as salient poles in a radial fashion on an annular outer peripheral surface. The rotor 20 is provided with a plurality of pairs of rotor teeth 21 opposed to each other in the radial direction. The number of pairs of rotor teeth 21 is smaller than the number of pairs of stator teeth 11.

FIG. 1 illustrates a three-phase (phase A formed of a pair of stator teeth 11a and winding wire 12a, phase B formed of a pair of stator teeth 11b and winding wire 12b, and phase C formed of a pair of stator teeth 11c and winding wire 12c) type formed of six stator teeth 11 and four rotor teeth 21. The rotor 20 is provided with a pair of rotor teeth 21x and a pair of rotor teeth 21y.

The SR motor 1 excites the stator tooth 11 by applying a current to the winding wire 12 of a certain phase to generate magnetic attractive force between the stator tooth 11 and the rotor tooth 21 in the vicinity of the stator tooth 11, thereby generating reluctance torque in a circumferential direction on the rotor 20. The magnetic attractive force may be resolved into component force in the radial direction and component force in the circumferential direction when the stator tooth 11 and the rotor tooth 21 are opposed to each other in the radial direction but they are not fully overlapped with each other. The reluctance torque is generated by the component force in the circumferential direction. In contrast, when the stator tooth 11 and the rotor tooth 21 are opposed to each other in the radial direction and are fully overlapped with each other, the magnetic attractive force acts only in the radial direction. Therefore, in the SR motor 1, the reluctance torque disappears when the stator tooth 11 and the rotor tooth 21 are opposed to each other in the radial direction and are fully overlapped with each other. Therefore, the SR motor 1 stops energizing the winding wire 12 of the phase to which the current is being applied, switches an energization target to the winding wire 12 of another phase, and generates the magnetic attractive force having the component force in the radial direction and the component force in the circumferential direction between the stator tooth 11 of a new phase and the rotor tooth 21 in the vicinity thereof. The SR motor 1 realizes rotational movement of the rotor 20 by repeatedly switching the energization target from phase to phase based on a positional relationship between the stator tooth 11 and the rotor tooth 21. Meanwhile, the stator tooth 11 which becomes an excitation target in association with application of the current to the winding wire 12 becomes a non-excitation target due to stop of energization of the winding wire 12 when this is opposed to the rotor tooth 21 in the radial direction and is fully overlapped therewith or before and after they are fully overlapped with each other, and thereafter becomes the excitation target again when a next rotor tooth 21 approaches a predetermined position.

The driving circuit 30 may apply the current to each winding wire 12 for each phase. Each phase of the driving circuit 30 is formed of two transistors and two diodes. The driving circuit 30 changes a current value flowing to the winding wire 12 by simultaneously turning on or off the two transistors in each phase. The phase A illustrated in FIG. 1 is provided with transistors Tra1 and Tra2 and diodes Da1 and Da2. The phase B is provided with transistors Trb1 and Trb2 and diodes Db1 and Db2. The phase C is provided with transistors Trc1 and Trc2 and diodes Dc1 and Dc2.

The control device 40 controls the driving circuit 30. The control device 40 will be described later in detail.

Figure 2:
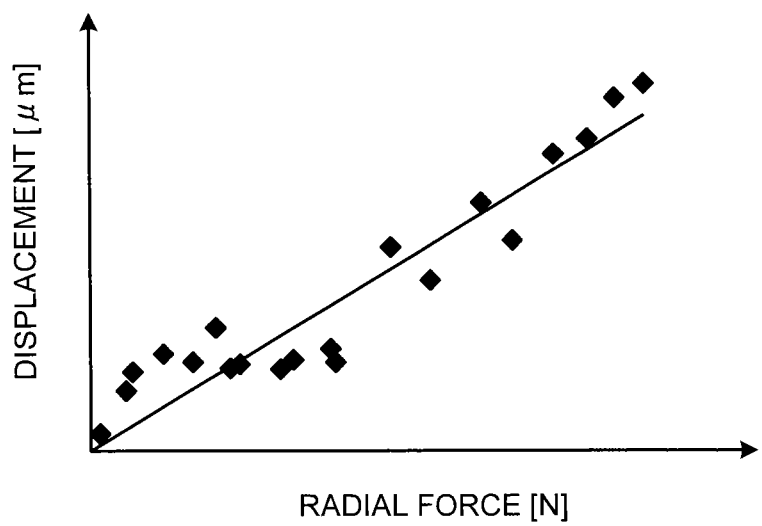
FIG. 2 is a view illustrating a relationship between radial force and displacement of a rotor.
Figure 3:
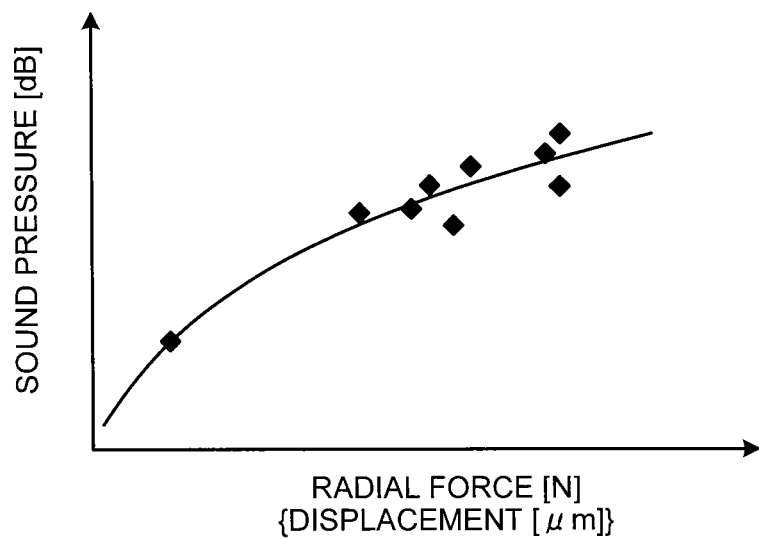
FIG. 3 is a view illustrating a relationship between the radial force and a sound pressure.

A conventional main problem of the SR motor 1 is inhibition of noise and vibration. In the SR motor 1, the component force in the radial direction (hereinafter, referred to as "radial force") of the magnetic attractive force causes the noise and vibration. FIG. 2 is a view illustrating a relationship between the radial force and displacement of the rotor 20 when the SR motor 1 is operated. The displacement of the rotor 20 is intended to mean the displacement of the rotor 20 caused by the radial force. As is understood from this drawing, the displacement of the rotor 20 becomes larger as the radial force increases. FIG. 3 is a view illustrating a relationship between the radial force (displacement of the rotor 20) and a sound pressure when the SR motor 1 is operated. As is understood from this drawing, the sound pressure when the SR motor 1 is operated becomes higher as the radial force (displacement of the rotor 20) becomes larger. Therefore, it is understood that the noise and vibration become larger as the radial force (displacement of the rotor 20) becomes larger in the SR motor 1. That is to say, the SR motor 1 may decrease the noise and vibration by decreasing the radial force which causes the displacement of the rotor 20.

Figure 4:
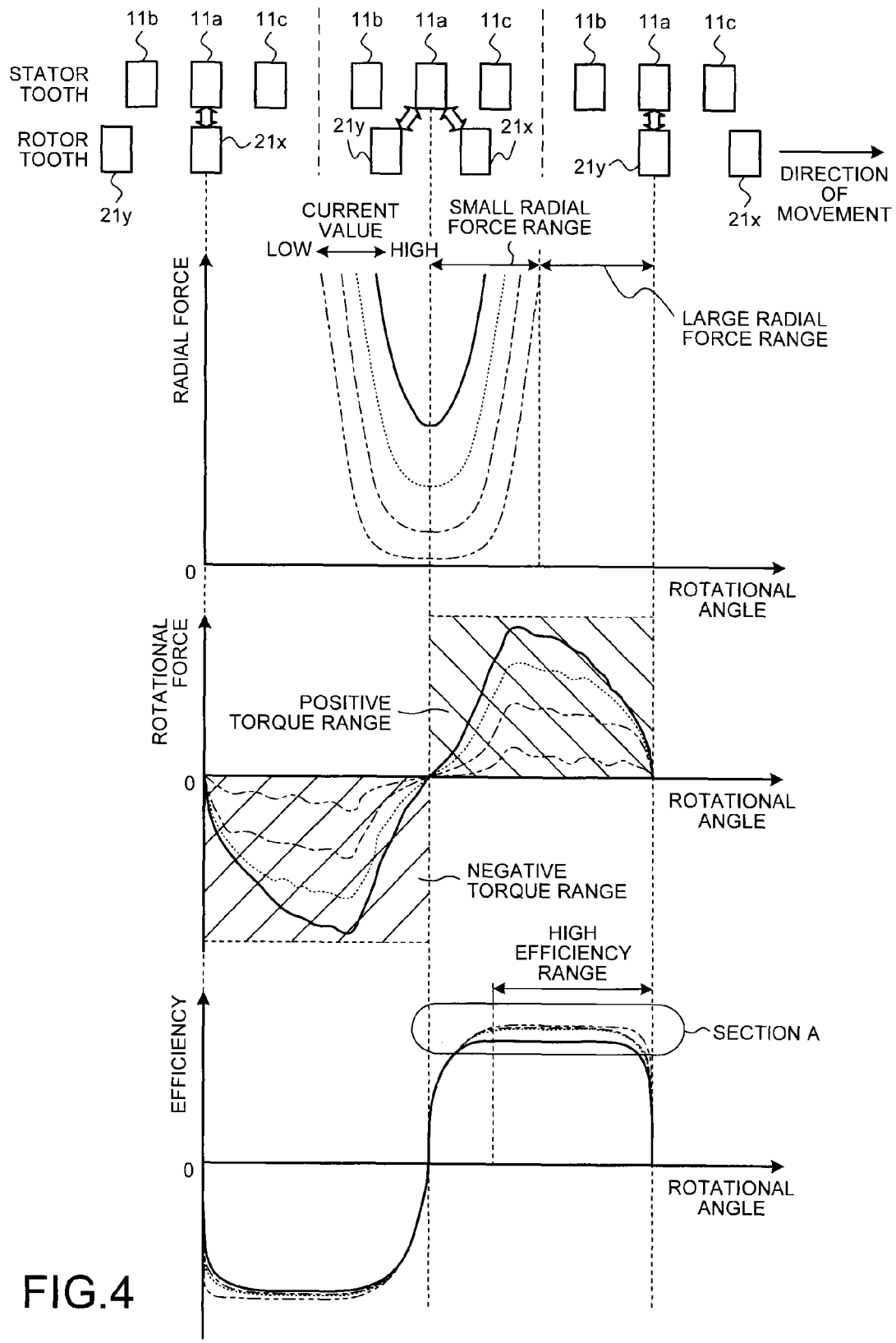
FIG. 4 is a view illustrating the radial force, rotational force, and efficiency according to a rotational angle of the rotor.

A relationship between a rotational angle of the rotor 20 and the radial force generated on the stator 10 is examined. FIG. 4 illustrates the relationship. This drawing illustrates change in phase in three places (positions associated with elapse of time) of a rotor tooth group (rotor teeth 21y and 21x) with respect to a certain stator tooth group (stator teeth 11b, 11a, and 11c) arranged in the circumferential direction. The radial force is the force when a certain current is continuously applied to the winding wire 12a of the stator tooth 11a of the phase A. This drawing illustrates four patterns of current values. Meanwhile, only a range not larger than a certain value of the radial force with respect to the rotational angle of the rotor 20 is illustrated for the purpose of illustration, but there is a value larger than the certain value. Furthermore, FIG. 4 also illustrates a relationship between the rotational angle and rotational force of the rotor 20 and a relationship between the rotational angle and efficiency (driving efficiency) of the SR motor 1. A rotational direction of the rotor 20 (rotor tooth 21) is represented as a direction of movement in FIG. 4 for the purpose of illustration.

In the illustration in FIG. 4, a certain current is continuously applied to the winding wire 12a of the stator tooth 11a also after the rotor tooth 21x and the stator tooth 11a are fully overlapped with each other in the radial direction. Therefore, the magnetic attractive force acts between the rotor tooth 21x and the stator tooth 11a until a relative distance between the stator tooth 11a of the phase A in an excited state and the rotor tooth 21y approaching the stator tooth 11a the most by rotation of the rotor 20 (hereinafter, also referred to as "first relative distance") becomes equal to a relative distance between a next rotor tooth 21x preceding this rotor tooth 21y in the rotational direction of the rotor 20 and the stator tooth 11a (hereinafter, also referred to as "second relative distance"). Until the first relative distance becomes equal to the second relative distance, the force in the circumferential direction of the magnetic attractive force acts in a direction opposite to the rotational direction of the rotor 20, so that the rotational force the direction of which is opposite to the rotational direction of the rotor 20 acts on the rotor 20. Therefore, this period is a negative torque range. Since the efficiency of the SR motor 1 is deteriorated in the negative torque range, it is preferable that the current is not applied to the winding wire 12a of the stator tooth 11a.

After the first relative distance becomes shorter than the second relative distance, the magnetic attractive force acts between the rotor tooth 21y and the stator tooth 11a until the rotor tooth 21y fully overlaps with the stator tooth 11a. Until the rotor tooth 21y fully overlaps with the stator tooth 11a, the force in the circumferential direction of the magnetic attractive force acts in the same direction as the rotational direction of the rotor 20, so that the rotational force the direction of which is the same as the rotational direction of the rotor 20 acts on the rotor 20. Therefore, this period is a positive torque range.

Figure 5:
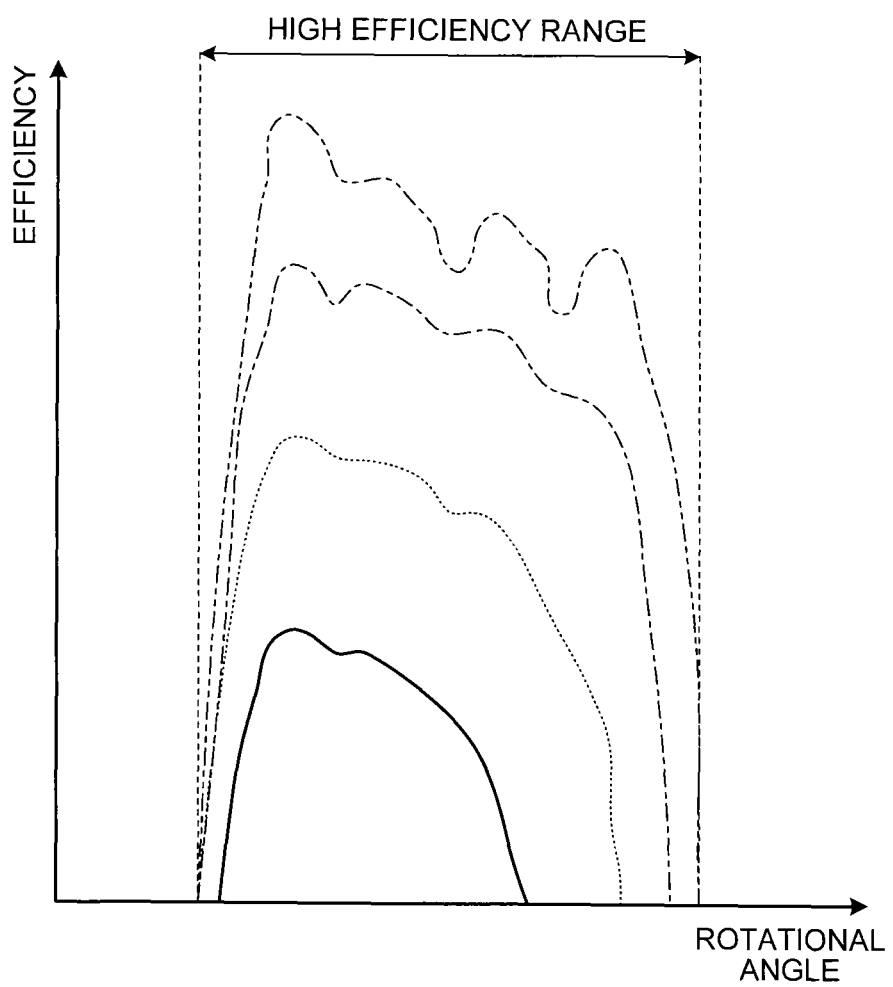
FIG. 5 is an enlarged view of a section A in FIG. 4.

In the positive torque range, the radial force increases as the rotor tooth 21x moves apart from the stator tooth 11a. Furthermore, in the positive torque range, the radial force is larger as the current value is higher with the same rotational angle of the rotor 20. It is possible to separate the positive torque range into a range with large radial force (large radial force range) and a range with small radial force (small radial force range) by setting a target value of the radial force. The target value is intended to mean the radial force which realizes a target sound pressure (that is to say, target oscillation and noise). In the large radial force range, the radial force increases as the rotor 20 rotates. Meanwhile, a boundary between the large range and the small range is an example provided for the purpose of description. In the positive torque range, the efficiency of the SR motor 1 is high. FIG. 5 is a view illustrating a high efficiency range in further detail.

Figure 6:
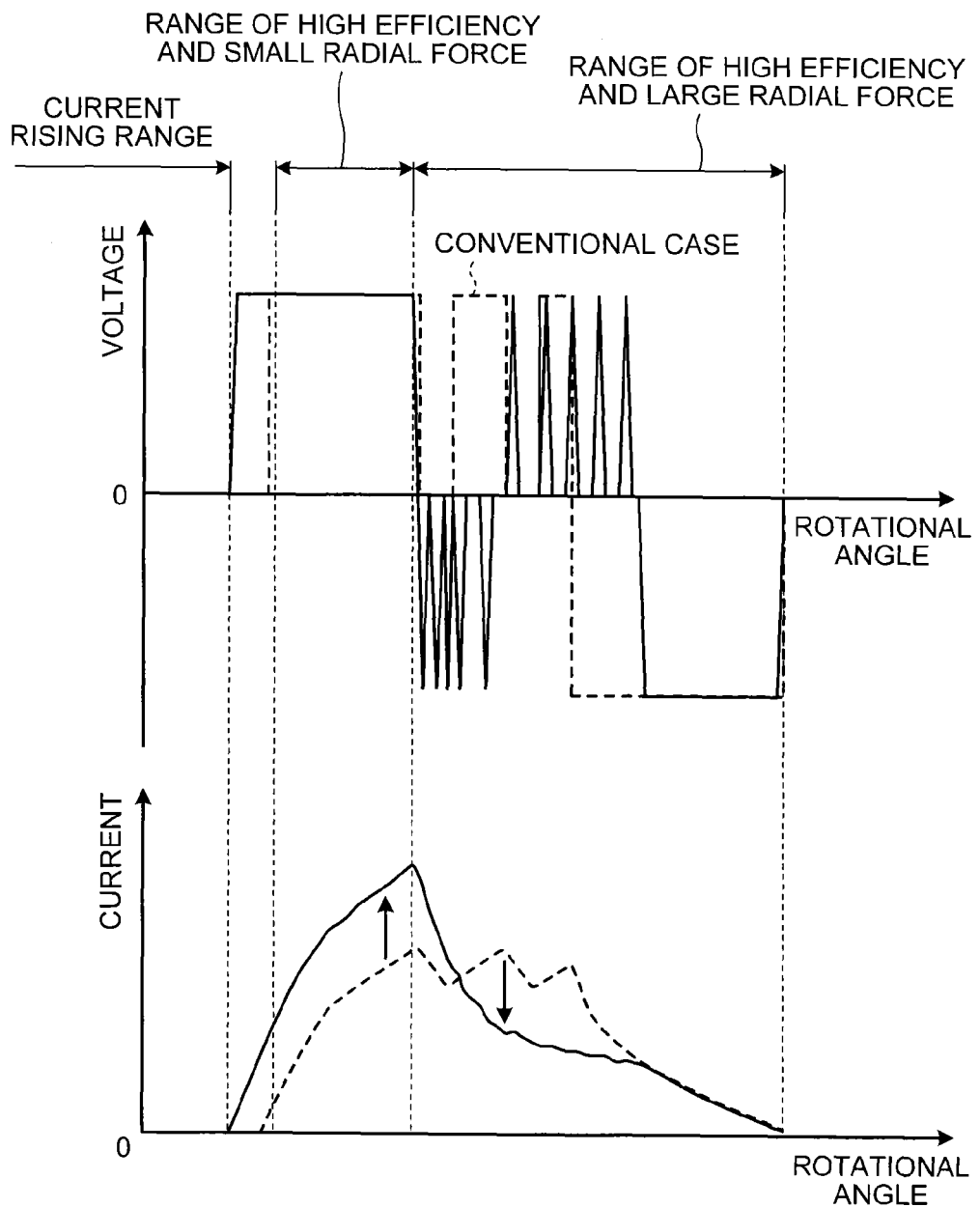
FIG. 6 is a view illustrating an applied voltage and an applied current for each range.

The control device 40 starts applying the current to the winding wire 12 of the stator tooth 11 based on a positional relationship between the stator tooth 11 being the non-excitation target and the rotor tooth 21 approaching the same the most. The control device 40 starts rising of the current to the winding wire 12 of the stator tooth 11 when the rotor tooth 21 enters a current rising range (FIG. 6). An applied voltage according to the rotational angle of the rotor 20 is illustrated on an upper side in FIG. 6. An applied current according to the rotational angle of the rotor 20 is illustrated on a lower side in FIG. 6. In FIG. 6, conventional applied voltage and applied current are indicated by broken lines for the purpose of comparison.

Figure 7:
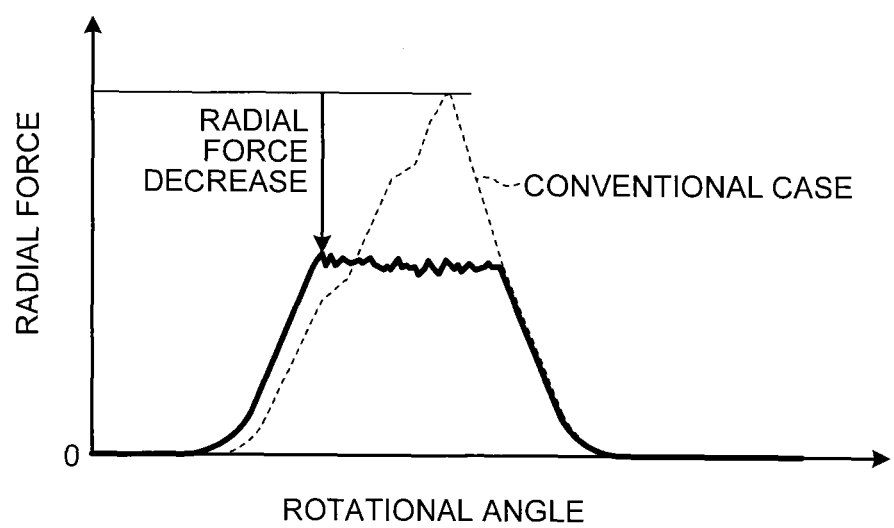
FIG. 7 is a view illustrating a decreasing effect of the radial force.

The rotor tooth 21 moves from the current rising range to a range of high efficiency and small radial force while shortening the relative distance to the stator tooth 11 switched to the excitation target. Then, the rotor tooth 21 moves to a range of high efficiency and large radial force while shortening the relative distance. In the range of high efficiency and large radial force, the current value to the winding wire 12 of the stator tooth 11 being the excitation target is made lower than that in the range of high efficiency and small radial force. For example, the current value to the winding wire 12 of the stator tooth 11 being the excitation target is made higher than the conventional current value from the current rising range to the range of high efficiency and small radial force, and is made lower than the conventional current value in the range of high efficiency and large radial force as illustrated in FIG. 6 as compared to the conventional current value. According to this, in the SR motor 1, the radial force may be made smaller than that in the conventional case as illustrated in FIG. 7. The current value to the winding wire 12 may be set such that the radial force is not larger than the target value.

Specifically, a series of current values is determined based on a width A in the circumferential direction of the stator tooth 11, a relative distance (first relative distance) B between the stator tooth 11 and the rotor tooth 21 approaching the stator tooth 11 the most by the rotation of the rotor 20, a relative distance (second relative distance) C between the next rotor tooth 21 preceding the rotor tooth 21 in the rotational direction of the rotor 20 and the stator tooth 11, and an overlap amount D of the stator tooth 11 and the rotor tooth 21 in the rotational direction of the rotor 20 when the stator tooth 11 is opposed to the rotor tooth 21 in the radial direction.

Figure 8:
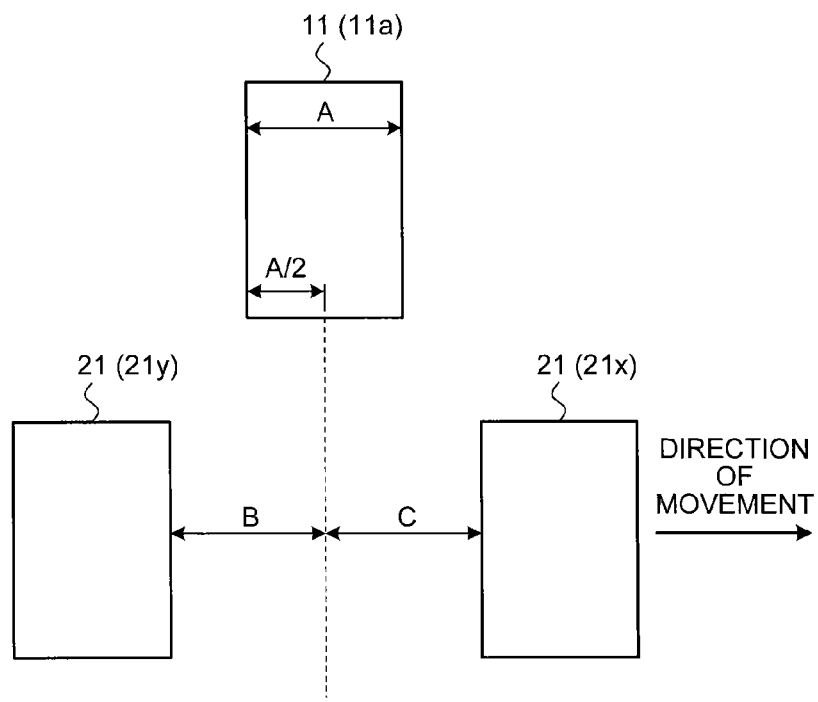
FIG. 8 is a view illustrating a positional relationship between a stator tooth and a rotor tooth.

The current rising range is set when the relative distance (first relative distance) B between the stator tooth 11 of the phase being the non-excitation target and the rotor tooth 21 approaching the stator tooth 11 being the non-excitation target the most by the rotation of the rotor 20 becomes equal to the relative distance (second relative distance) C between the next rotor tooth 21 preceding the rotor tooth 21 in the rotational direction of the rotor 20 and the stator tooth 11 being the non-excitation target. Therefore, the control device 40 starts the rising of the current to the winding wire 12 of the stator tooth 11 being the non-excitation target when the first relative distance B becomes equal to or shorter than the second relative distance C (FIG. 8).

Figure 9:
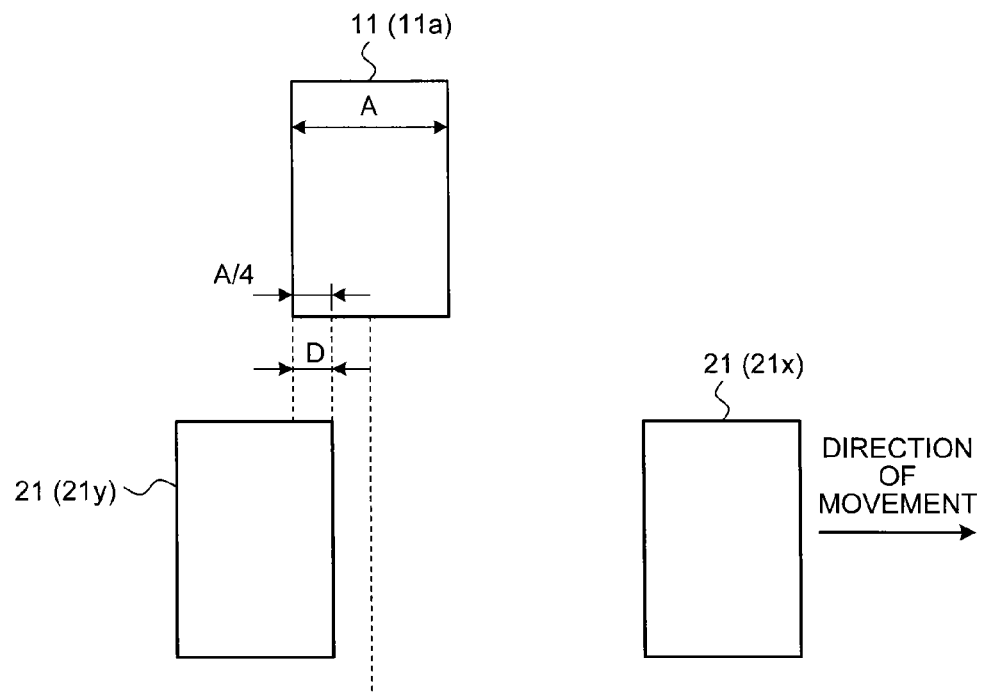
FIG. 9 is a view illustrating the positional relationship between the stator tooth and the rotor tooth.

The range of high efficiency and small radial force starts when the stator tooth 11 starts opposing to the rotor tooth 21 in the radial direction and ends when the rotor tooth 21 reaches one-quarter of the width A in the circumferential direction of the stator tooth 11. Therefore, the control device 40 applies a large current value to the winding wire 12 of the stator tooth 11 switched from the non-excitation target to the excitation target while continuing the rising of the current equivalent to that in the current rising range or controlling the rising of the current to be smaller than that in the rising range when the overlap amount D in the circumferential direction is not smaller than 0 and not larger than A/4 (FIG. 9). The current value is set such that the radial force is not larger than the target value.

Figure 10:
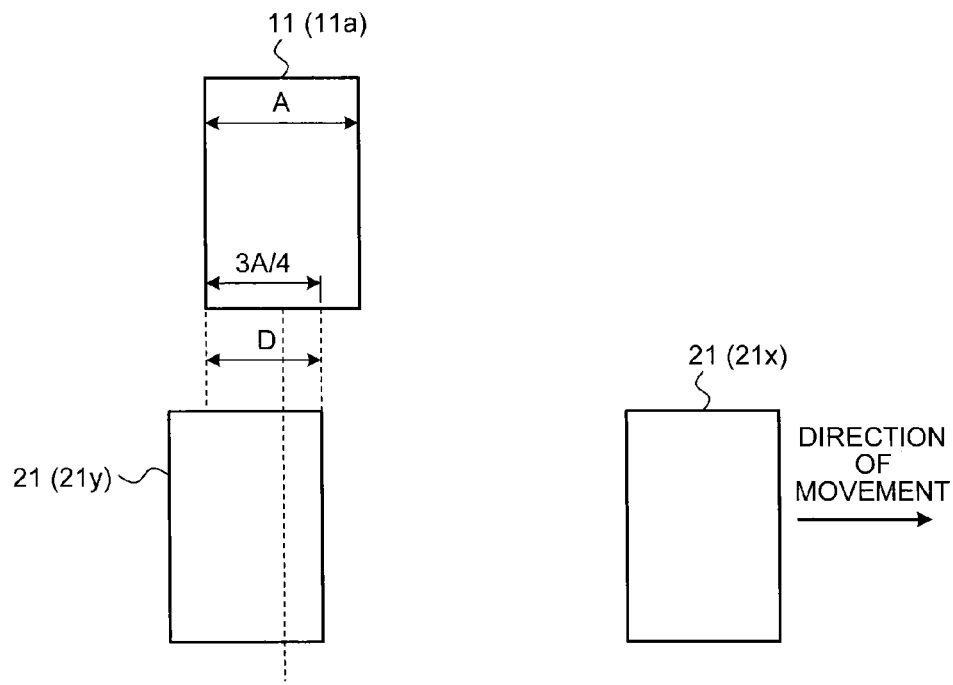
FIG. 10 is a view illustrating the positional relationship between the stator tooth and the rotor tooth.

The range of high efficiency and large radial force starts after the rotor tooth 21 reaches one-quarter of the width A in the circumferential direction of the stator tooth 11 and ends when the rotor tooth 21 reaches three-quarters of the width A in the circumferential direction of the stator tooth 11. Therefore, the control device 40 decreases the current value when the overlap amount D is larger than A/4 and not larger than 3A/4 (FIG. 10). The control device 40 may start falling of the current at that time. The control device 40 starts decreasing the current value when the overlap amount D becomes larger than A/4. The current value is set such that the radial force is not larger than the target value.

Figure 11:
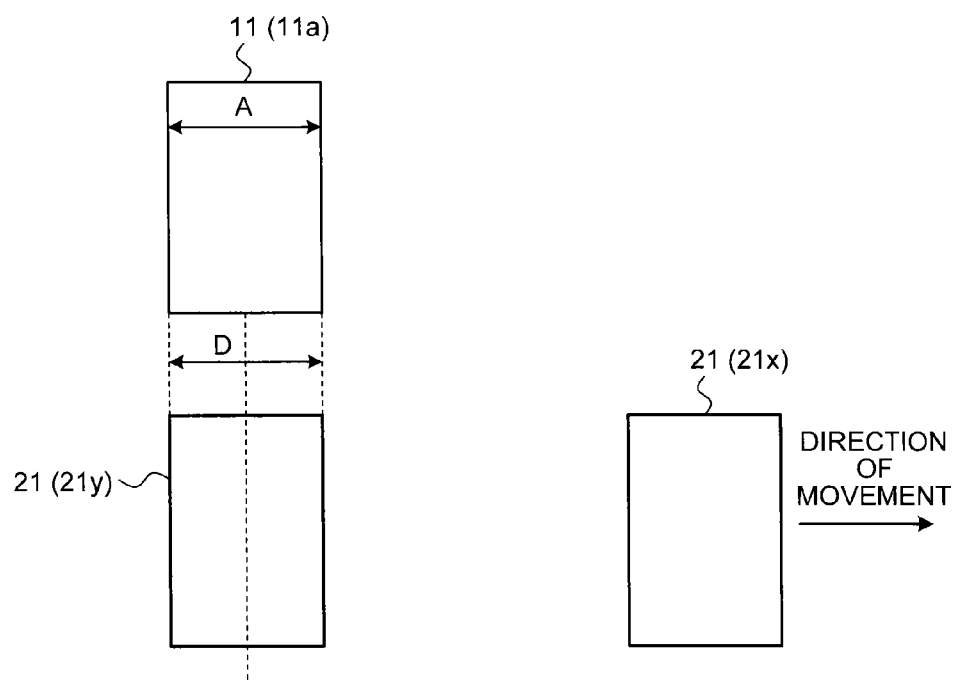
FIG. 11 is a view illustrating the positional relationship between the stator tooth and the rotor tooth.

The efficiency of the SR motor 1 is not so excellent as that in the above-described high-efficiency range after the rotor tooth 21 reaches three-quarters of the width A in the circumferential direction of the stator tooth 11 until the rotor tooth 21 fully overlaps with the stator tooth 11 in the radial direction (FIG. 11). During this period, the radial force easily increases. Therefore, the control device 40 allows the current to fall when the overlap amount D is larger than 3A/4 and not larger than A. The control device 40 starts the falling of the current when the overlap amount D becomes larger than 3A/4. However, even when the overlap amount D falls within this range, if the SR motor 1 cannot efficiently generate required output torque or if the SR motor 1 does not realize the required output torque (that is to say, when actual output torque is not sufficient for the required output torque), the control device 40 continues supplying the current while decreasing the current value, for example, without allowing the current to fall.

After the rotor tooth 21 fully overlaps with the stator tooth 11, it enters the negative torque range, so that the current supply to the winding wire 12 of the stator tooth 11 is stopped. At the time of continuous current control, the current supply according to the control may be performed.

As described above, the SR motor 1 of this embodiment starts the rising of the current to the winding wire 12 of the stator tooth 11 being the non-excitation target when the relative distance (first relative distance) B between the stator tooth 11 of the phase being the non-excitation target due to the stop of the energization to the winding wire 12 and the rotor tooth 21 approaching the stator tooth 11 being the non-excitation target in the rotational direction of the rotor 20 becomes equal to or shorter than the relative distance (second relative distance) C between the next rotor tooth 21 preceding the rotor tooth 21 in the rotational direction of the rotor 20 and the stator tooth 11 being the non-excitation target. Then, the SR motor 1 allows the current applied to the winding wire 12 of the stator tooth 11 being the excitation target to fall when the stator tooth 11 which becomes the excitation target due to the rising of the current and the rotor tooth 21 approaching the stator tooth 11 start opposing to each other in the radial direction and the overlap amount D in the rotational direction of the rotor 20 between the stator tooth 11 and rotor tooth 21 opposed to each other becomes larger than 3A/4 as a predetermined amount.

At that time, the SR motor 1 continues applying the large current value to the winding wire 12 of the stator tooth 11 while maintaining the rising of the current rising range after the rising of the current is started until the stator tooth 11 and the rotor tooth 21 start opposing to (overlapping with) each other. As described above, this period is the range of high efficiency and small radial force. Therefore, the SR motor 1 may control the radial force to be smaller (to be not larger than the target value) while maintaining the high efficiency in this range. Therefore, the SR motor 1 may inhibit the noise and vibration while operating at high efficiency in this range.

When the overlap amount D of the stator tooth 11 and the rotor tooth 21 becomes larger than the predetermined amount, it enters the range of high efficiency and large radial force as described above. Since the SR motor 1 allows the current to the winding wire 12 of the stator tooth 11 to fall at that time, this may control the radial force to be smaller (to be not larger than the target value) while maintaining the high efficiency. Therefore, the SR motor 1 after that time may inhibit the noise and vibration while operating at high efficiency.

Since the SR motor 1 stops supplying the current to the winding wire 12 of the stator tooth 11 when the stator tooth 11 fully overlaps with the rotor tooth 21 in the radial direction, this may inhibit deterioration in efficiency and avoid the noise and vibration between the stator tooth 11 and the rotor tooth 21.

In this manner, the SR motor 1 of this embodiment allows the current to rise until the overlap amount D reaches the predetermined amount and allows the current to fall when the overlap amount D becomes larger than the predetermined amount. Therefore, the SR motor 1 may inhibit the noise and vibration while ensuring desired efficiency from the rising of the current to the falling of the current. Meanwhile, tendency of magnitude of the radial force with respect to the efficiency of the SR motor 1 varies according to a physical property, specification and the like of the SR motor 1. Therefore, although the predetermined amount is described to be 3A/4 in the illustration above, the predetermined amount is merely an example and might change according to the physical property, the specification and the like of the SR motor 1.

First Variation

The SR motor 1 of the above-described embodiment controls the current applied to the winding wire 12 of the stator tooth 11 based on the positional relationship between the stator tooth 11 and the rotor tooth 21. In this variation, a current applied to winding wire 12 is controlled based on a change amount of inductance of the winding wire 12 with respect to a change amount of a rotational angle of a rotor 20. Meanwhile, an SR motor 1 of this variation is obtained by changing an arithmetic processing function of a control device 40 of the SR motor 1 of the embodiment.

Figure 12:
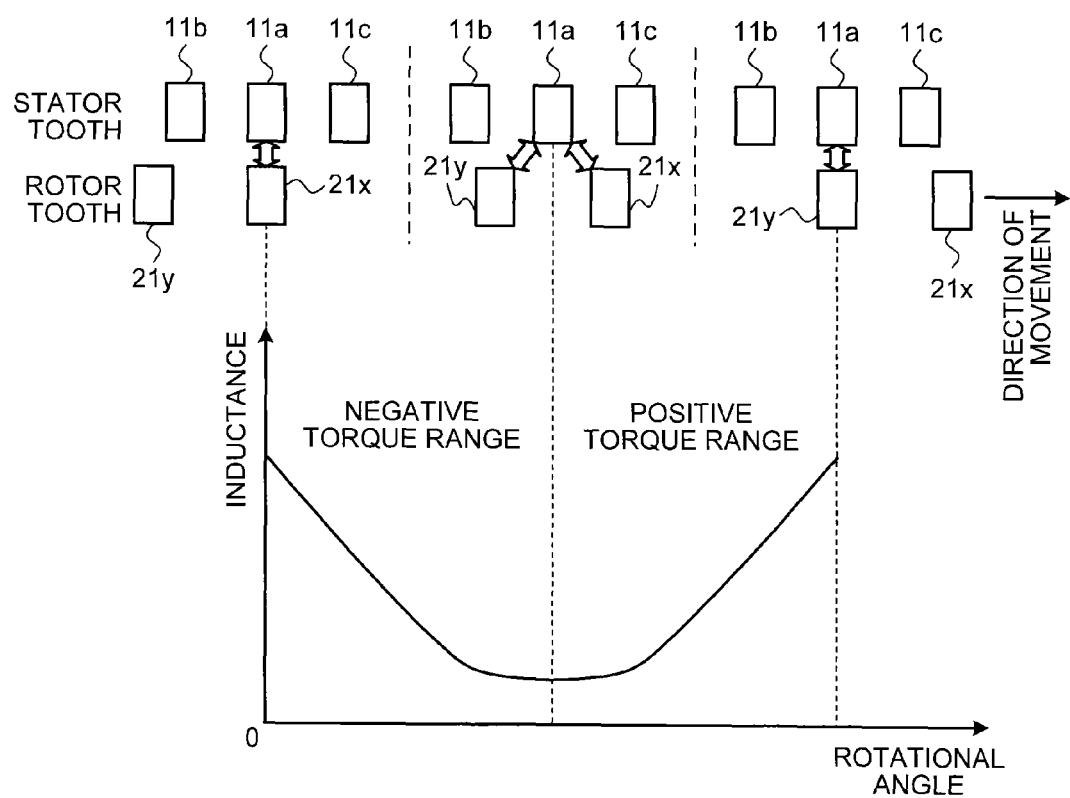
FIG. 12 is a view illustrating a relationship between the rotational angle of the rotor and inductance of winding wire.

FIG. 12 illustrates a relationship between the rotational angle of the rotor 20 and the inductance of the winding wire 12. This drawing illustrates the inductance of winding wire 12a of a stator tooth 11a. This drawing illustrates change in phase in three places (positions in association with elapse of time) of a rotor tooth group (rotor teeth 21y and 21x) with respect to a certain stator tooth group (stator teeth 11b, 11a, and 11c) arranged in a circumferential direction as in FIG. 4.

As described above, when a first relative distance B becomes equal to a second relative distance C, it switches from a negative torque range to a positive torque range. At the time of the switching, the change amount of the inductance of the winding wire 12 with respect to the change amount of the rotational angle of the rotor 20 is also switched from a negative amount to a positive amount. Therefore, when the change amount of the inductance of the winding wire 12 with respect to the change amount of the rotational angle of the rotor 20 is switched from the negative amount to the positive amount, the control device 40 starts rising of the current to the winding wire 12a.

The control device 40 obtains a product of the change amount of the inductance of the winding wire 12 with respect to the change amount of the rotational angle of the rotor 20 and a rotational speed of the rotor 20 after the rising of the current. Then, the control device 40 controls the current applied to the winding wire 12a such that the product is not smaller than a predetermined value and radial force between the stator tooth 11a and the rotor tooth 21y is not larger than a target value (value described in the embodiment).

The SR motor 1 of this variation may obtain an effect similar to that of the SR motor 1 of the embodiment also when performing such current control.

Second Variation

An SR motor 1 of this variation is obtained by changing an arithmetic processing function of a control device 40 of the SR motor 1 of the above-described embodiment and first variation.

Figure 13:
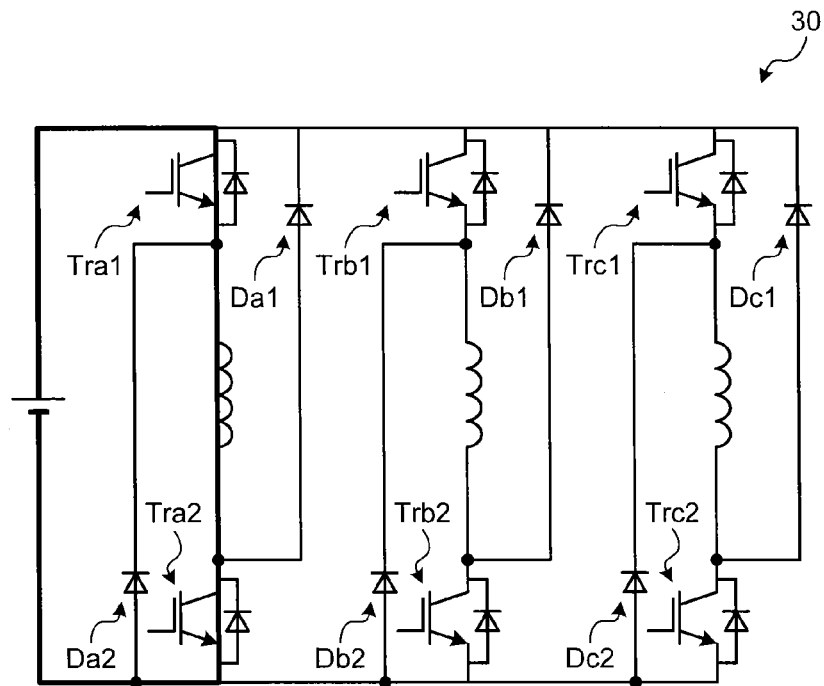
FIG. 13 is a view illustrating a positive voltage mode.
Figure 14:
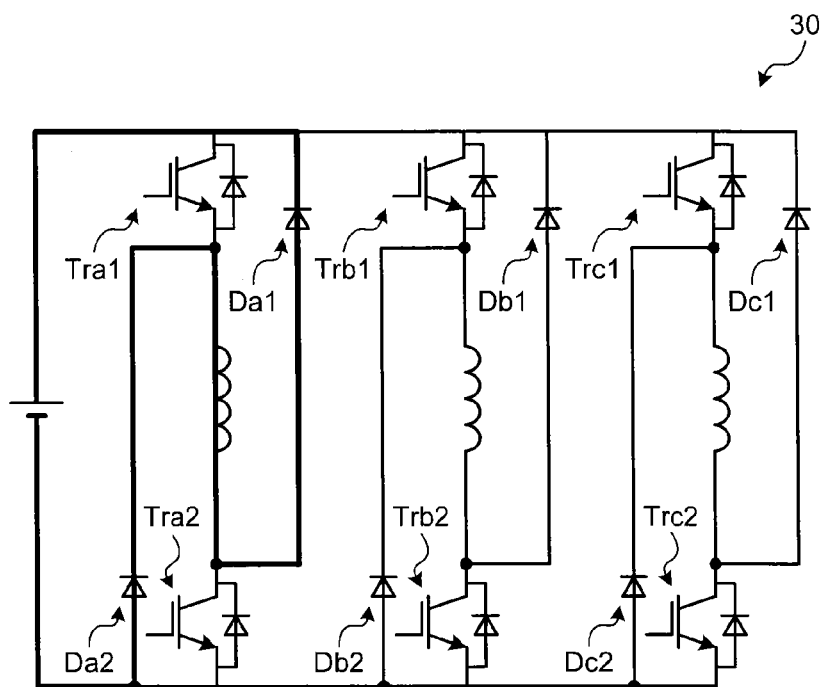
FIG. 14 is a view illustrating a negative voltage mode.
Figure 15:
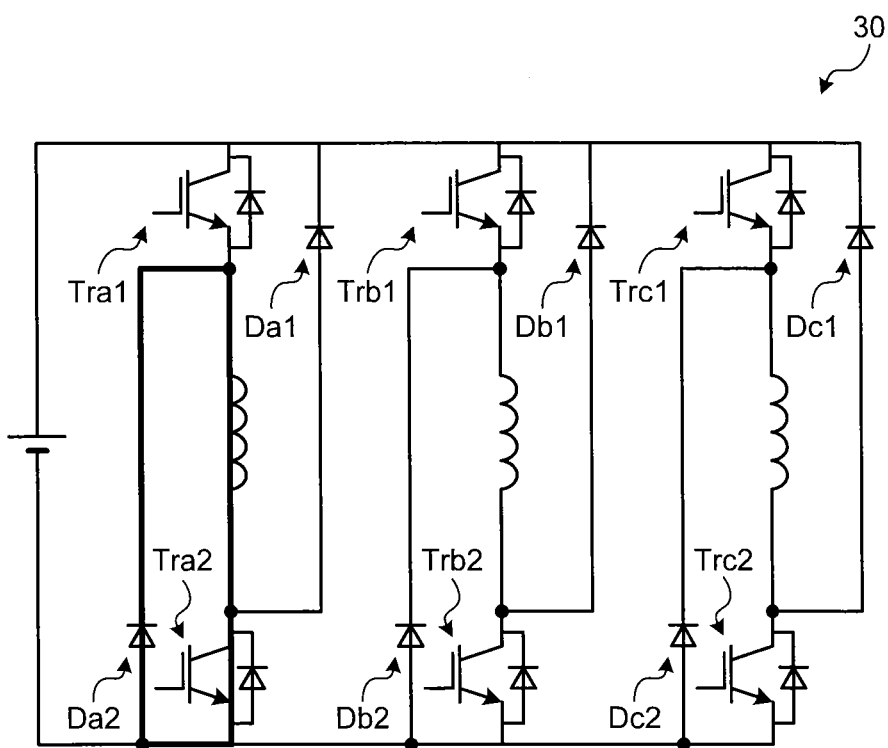
FIG. 15 is a view illustrating a circulation mode.

The control device 40 may switch a driving circuit 30 to a positive voltage mode, a negative voltage mode, or a circulation mode. The positive voltage mode is the mode for applying a positive voltage to winding wire 12 (FIG. 13). The negative voltage mode is the mode for applying a negative voltage to the winding wire 12 (FIG. 14). The circulation mode is the mode for allowing a current to circulate in a circuit of the driving circuit 30 through the winding wire 12 without applying the voltage to the winding wire 12 (FIG. 15). Meanwhile, FIGS. 13 to 15 illustrate only switching of a voltage applying mode in a phase A. The switching of the voltage applying mode may be similarly performed for phases B and C.

The control device 40 of this variation selects the circulation mode or the negative voltage mode based on a rotational speed of a rotor 20 and a current command value to the winding wire 12 when allowing the current being applied to the winding wire 12 to fall.

Efficiency of the SR motor 1 is higher in the circulation mode than in the negative voltage mode. Therefore, when the control device 40 determines that the current may sufficiently fall in the circulation mode (that is to say, a target current waveform at the time of falling may be realized in the circulation mode), this selects the circulation mode in preference to the negative voltage mode. In contrast, when the control device 40 determines that the target current waveform at the time of falling (that is to say, the target current command value at the time of falling) cannot be realized in the circulation mode, this selects the negative voltage mode to allow the current to rapidly fall as compared to a case when the circulation mode.

Figure 16:
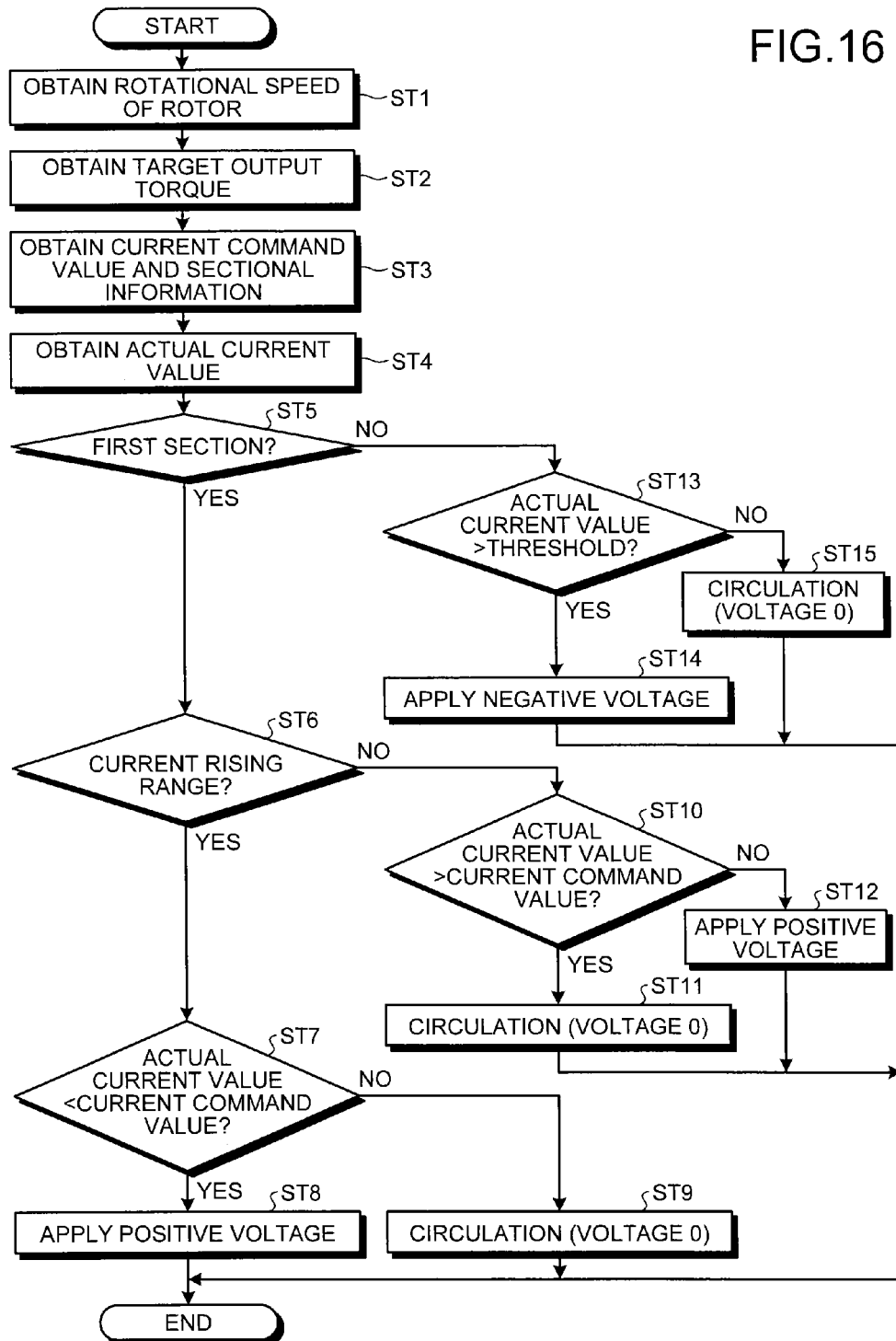
FIG. 16 is a flowchart illustrating arithmetic processing of a second variation.

FIG. 16 is a flowchart illustrating the switching of the voltage applying mode of this variation.

The control device 40 obtains various pieces of information required for arithmetic processing (steps ST1 to ST4).

At step ST1, information of the rotational speed of the rotor 20 is obtained based on a detection signal of a rotational speed sensor 51. The rotational speed sensor 51 is a resolver for detecting the rotational speed of the rotor 20 and the like.

At step ST2, information of target output torque is obtained based on a command value and the like of the target output torque to the SR motor 1.

At step ST3, information of the current command value and sectional information of the current command value are obtained for each phase based on a map according to the target output torque, for example. The sectional information of the current command value is the information for distinguishing between a first section in which the current command value is not 0 and a second section in which the current command value is 0. The first section is the section in which a current rising range and a range of high efficiency and small radial force described in the embodiment are set. The second section is the section in which a range of high efficiency and large radial force (in other words, current falling range) described in the embodiment is set.

At step ST4, an actual current value is obtained for each phase based on a detection signal of a current detecting device 52. The current detecting device 52 is provided with a current sensor capable of detecting the actual current value to the winding wire 12 for each phase.

The control device 40 performs subsequent arithmetic processing for each phase based on the obtained information for each phase.

The control device 40 determines whether a current section is the first section based on the obtained sectional information of the current command value of a phase being a control target (step ST5).

When the control device 40 determines that the section is the first section, this determines whether the first section is the current rising range (step ST6).

When the control device 40 determines that this is the current rising range, this determines whether the actual current value of this phase is smaller than the current command value of the rising range (step ST7).

When the control device 40 determines that the actual current value is smaller than the current command value, this controls the circuit of this phase in the driving circuit 30 to the positive voltage mode and applies the positive voltage to the winding wire 12 of this phase (step ST8). According to this, the actual current value increases in the phase being the control target. At step ST8, it is desirable to control for each rotational angle of the rotor 20 such that the actual current value reaches the current command value or this approaches the current command value. Therefore, since the actual current value may be rapidly increased in the phase being the control target, rapid current rising becomes possible.

In contrast, when the control device 40 determines that the actual current value is not smaller than the current command value, this controls the circuit of this phase in the driving circuit 30 to the circulation mode and allows the current to circulate in the circuit through the winding wire 12 without applying the voltage to the winding wire 12 of this phase (step ST9). According to this, the actual current value decreases in the phase being the control target.

When the control device 40 determines that the range is not the current rising range (that is to say, this is the range of high efficiency and small radial force) at step ST6, this determines whether the actual current value of this phase is larger than the current command value of the range (step ST10).

When the control device 40 determines that the actual current value is larger than the current command value, this selects the circulation mode as at step ST9 and allows the current to circulate in the circuit of this phase through the winding wire 12 without applying the voltage to the winding wire 12 of this phase (step ST11). According to this, the actual current value decreases in the phase being the control target.

In contrast, when the control device 40 determines that the actual current value is not larger than the current command value, this selects the positive voltage mode as at step ST8 and applies the positive voltage to the winding wire 12 of this phase (step ST12). According to this, the actual current value increases in the phase being the control target. The actual current value is desirably controlled so as to reach the current command value or to approach the current command value as at step ST8. Therefore, in the phase being the control target, it is possible to apply a large current value while continuing the rising of the current equivalent to that in the current rising range or controlling the rising of the current to be lower than that in the rising range.

When the control device 40 determines that the current section is not the first section (that is to say, this is the second section and an overlap amount D is larger than a predetermined value) at step ST5, this determines whether the actual current value of the winding wire 12 of the stator tooth 11 in the phase being a current falling target is larger than a predetermined threshold (step ST13). The predetermined threshold is set based on the current command value in the second section {that is to say, the range of high efficiency and large radial force (current falling range)}, for example. For example, an average value and the like of the current command value for each rotational angle of the rotor 20 in the second section is herein set as the predetermined threshold.

When the control device 40 determines that the actual current value is larger than the predetermined threshold even though the section is the second section, this controls the circuit of this phase in the driving circuit 30 to the negative voltage mode and applies the negative voltage to the winding wire 12 of this phase (step ST14). According to this, the actual current value may be rapidly decreased in the phase being the control target, so that the rapid current falling becomes possible.

In contrast, when the control device 40 determines that the actual current value is not larger than the predetermined threshold, sufficient current falling may be realized without selecting the negative voltage mode, so that this selects the circulation mode as at step ST9 and allows the current to circulate in the circuit of the phase regarding the winding wire 12 in the driving circuit 30 through the winding wire 12 without applying the voltage to the winding wire 12 of this phase (step ST15). According to this, the current falls with the high efficiency maintained in the phase being the control target.

The SR motor 1 of this variation may inhibit noise and vibration while improving the efficiency as compared to the SR motor 1 of the embodiment and the first variation by controlling in this manner. Meanwhile, the current value applied to the winding wire 12 is desirably set such that the radial force is not larger than a target value described above.

Third Variation

An SR motor 1 of this variation is obtained by changing an arithmetic processing function of a control device 40 of the SR motor 1 of the above-described second variation.

Figure 17:
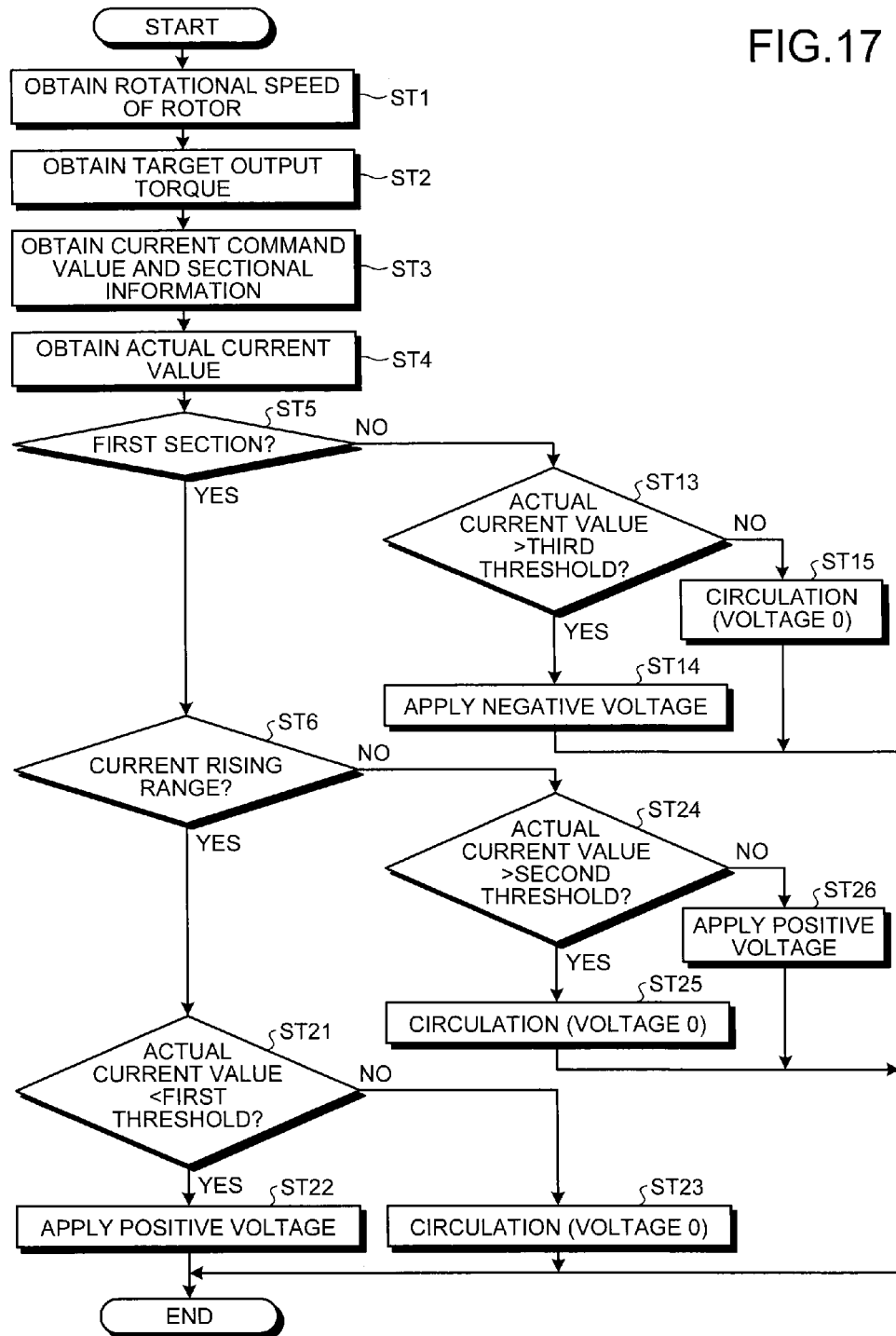
FIG. 17 is a flowchart illustrating arithmetic processing of a third variation.

FIG. 17 is a flowchart illustrating switching of a voltage applying mode in this variation. Meanwhile, in this drawing, at step "STxx" the same as in FIG. 16 of the second variation, the same arithmetic processing as that at the step in FIG. 16 is performed. Therefore, in the following description, the arithmetic processing the same as that of the second variation is not repeated. At step ST13 in this drawing, a threshold at step ST13 in FIG. 16 is referred to as a third threshold. The control device 40 performs the arithmetic processing after step ST5 for each phase based on obtained information for each phase in this variation also.

When the control device 40 determines that a first section is a current rising range at step ST6, this determines whether an actual current value of this phase is smaller than a first threshold (step ST21). The first threshold is set to a current command value after rising in the current rising range, for example.

When the control device 40 determines that the actual current value is smaller than the first threshold, this controls a circuit of this phase in a driving circuit 30 to a positive voltage mode and applies a positive voltage to winding wire 12 of this phase (step ST22). According to this, since the actual current value may be rapidly increased in the phase being a control target, rapid current rising becomes possible.

In contrast, when the control device 40 determines that the actual current value is not smaller than the first threshold, this controls the circuit of this phase in the driving circuit 30 to a circulation mode and allows the current to circulate in the circuit through the winding wire 12 without applying the voltage to the winding wire 12 of this phase (step ST23). According to this, the actual current value decreases in the phase being the control target.

When the control device 40 determines that this is not the current rising range at step ST6 (that is to say, this is a range of high efficiency and small radial force), this determines whether the actual current value of this phase is larger than a second threshold (step ST24). The second threshold is set based on the current command value in the range of high efficiency and small radial force, for example.

When the control device 40 determines that the actual current value is larger than the second threshold, this selects the circulation mode as at step ST23 and allows the current to circulate in the circuit of this phase through the winding wire 12 without applying the voltage to the winding wire 12 of this phase (step ST25). According to this, the actual current value decreases in the phase being the control target.

In contrast, when the control device 40 determines that the actual current value is not larger than the second threshold, this selects the positive voltage mode as at step ST22 and applies the positive voltage to the winding wire 12 of this phase (step ST26). According to this, the actual current value increases in the phase being the control target. The actual current value is desirably controlled so as to reach the current command value of this range or to approach the current command value.

The SR motor 1 of this variation may obtain an effect similar to that of the SR motor 1 of the second variation also when performing such current control. Meanwhile, the current value applied to the winding wire 12 is desirably set such that the radial force is not larger than a target value described above.

Fourth Variation

An SR motor 1 of this variation is obtained by changing an arithmetic processing function of a control device 40 of the SR motor 1 of the above-described second variation.

Figure 18:
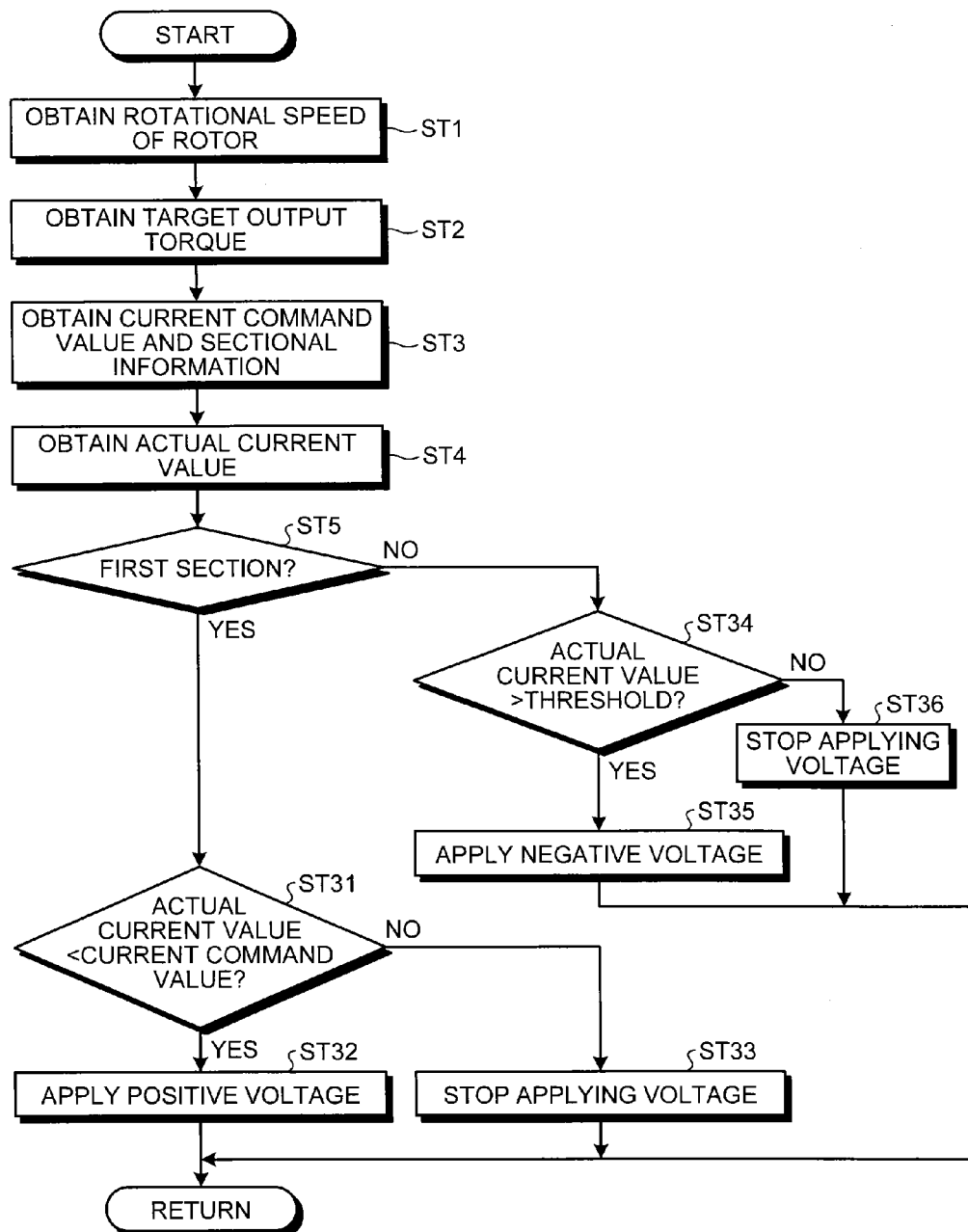
FIG. 18 is a flowchart illustrating arithmetic processing of a fourth variation.

FIG. 18 is a flowchart illustrating switching of a voltage applying mode in this variation. Meanwhile, in this drawing, at step "STxx" the same as in FIG. 16 of the second variation, the same arithmetic processing as that at the step in FIG. 16 is performed. Therefore, in the following description, the arithmetic processing the same as that of the second variation is not repeated. The control device 40 performs the arithmetic processing after step ST5 for each phase based on obtained information for each phase in this variation also.

When the control device 40 determines that a current section is a first section at step ST5, this determines whether an actual current value of this phase is smaller than a current command value of the first section (step ST31).

When the control device 40 determines that the actual current value is smaller than the current command value, this controls a circuit of this phase in a driving circuit 30 to a positive voltage mode and applies a positive voltage to winding wire 12 of this phase (step ST32). According to this, the actual current value increases in the phase being the control target. At step ST32, this controls for each rotational angle of a rotor 20 such that the actual current value reaches the current command value or this approaches the current command value. Therefore, in the phase being the control target, it is possible to allow a current to rapidly rise in a case of a current rising range, and to apply a large current value while continuing current rising equivalent to that in the current rising range or controlling the current rising to be lower than that in the rising range in a case of a range of high efficiency and small radial force.

In contrast, when the control device 40 determines that the actual current value is not smaller than the current command value, this stops applying the voltage to the winding wire 12 of this phase (step ST33). According to this, the actual current value decreases in this phase. In this variation, since the procedure returns to step ST1, when the section is still the first section, the actual current value is eventually controlled to reach the current command value or approach the current command value.

When the control device 40 determines that the current section is not the first section at step ST5 (that is to say, this is the second section), this determines whether the actual current value of this phase is larger than a predetermined threshold (step ST34). The predetermined threshold (fourth threshold) is set to 0 or a current value close to 0 (>0), for example. The current value close to 0 is the value determined in consideration of a detection error and the like of a current detecting device 52, for example.

When the control device 40 determines that the actual current value is larger than the predetermined threshold even though the section is the second section {range of high efficiency and large radial force (current falling range)}, this controls the circuit of this phase in the driving circuit 30 to a negative voltage mode and applies a negative voltage to the winding wire 12 of this phase (step ST35). According to this, the actual current value may be rapidly decreased in the phase being the control target, so that rapid current falling becomes possible.

In contrast, when the control device 40 determines that the actual current value is not larger than the predetermined threshold, this stops applying the voltage to the winding wire 12 of this phase (step ST36). According to this, the current falling is finished in this phase, so that the actual current value reaches 0.

The SR motor 1 of this variation may obtain an effect similar to that of the SR motor 1 of the second variation also when performing such current control. Meanwhile, the current value applied to the winding wire 12 is desirably set such that radial force is not larger than a target value described above.

An inner-rotor type SR motor 1 is described as an example in the above-described embodiment and variation. The control described in the embodiment and variation may also be applied to the SR motor on an outer-rotor type (with a rotor arranged on an outer side in a radial direction of a stator) to obtain an effect similar to that of the inner-rotor type.

The switched reluctance motor according to the embodiment allows the current to rise until the overlap amount reaches a predetermined amount and allows the current to fall when the overlap amount becomes larger than the predetermined value. The switched reluctance motor according to the embodiment controls the current applied to the winding wire based on the change amount of the inductance of the winding wire with respect to the change amount of the rotational angle of the rotor. Therefore, the switched reluctance motor may inhibit the noise and vibration while ensuring the desired efficiency while the current is applied to the winding wire.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A switched reluctance motor comprising:
   a stator provided with a plurality of stator teeth as salient poles in a radial fashion with winding wire wound around each of the plurality of stator teeth;
   a rotor provided with a plurality of rotor teeth as salient poles in a radial fashion;
   a driving circuit configured to apply a current to the winding wire for each phase; and
   a control device configured to control the driving circuit, the control device being configured to perform:
      starting rising of a current to the winding wire of a stator tooth of a phase being a non-excitation target due to stop of energization to the winding wire at a time a relative distance in a rotational direction of the rotor between the stator tooth of the phase being the non-excitation target and a rotor tooth approaching the stator tooth of the phase being the non-excitation target in the rotational direction becomes not larger than a relative distance between a next rotor tooth preceding the rotor tooth in the rotational direction of the rotor and the stator tooth of the phase being the non-excitation target; and
      allowing the current applied to the winding wire of the stator tooth of the phase being an excitation target to fall at a time the stator tooth which becomes the excitation target due to the rising of the current and the rotor tooth approaching the stator tooth start opposing to each other in a radial direction and an overlap amount in the rotational direction of the rotor between the stator tooth and the rotor tooth opposing to each other becomes larger than a predetermined amount.

2. The switched reluctance motor according to claim 1, wherein, the control device is configured to allow the current to circulate in a circuit of a phase regarding the winding wire in the driving circuit through the winding wire at a time the overlap amount is larger than the predetermined amount and an actual current value of the winding wire of the stator tooth being a current falling target is not larger than a threshold.

3. The switched reluctance motor according to claim 2, wherein, the control device is configured to apply a negative voltage to the winding wire at a time the overlap amount is larger than the predetermined amount and the actual current value of the winding wire of the stator tooth being the current falling target is larger than the threshold.

4. The switched reluctance motor according to claim 1, wherein a current value applied to the winding wire is set such that radial force of magnetic attractive force between the stator tooth and the rotor tooth is not larger than a target value.

5. The switched reluctance motor according to claim 2, wherein a current value applied to the winding wire is set such that radial force of magnetic attractive force between the stator tooth and the rotor tooth is not larger than a target value.

6. The switched reluctance motor according to claim 3, wherein a current value applied to the winding wire is set such that radial force of magnetic attractive force between the stator tooth and the rotor tooth is not larger than a target value.

7. A switched reluctance motor comprising:
a stator provided with a plurality of stator teeth as salient poles in a radial fashion with winding wire wound around each of the plurality of stator teeth;
a rotor provided with a plurality of rotor teeth as salient poles in a radial fashion;
a driving circuit configured to apply a current to the winding wire for each phase; and
a control device configured to control the driving circuit, the control device being configured to perform:
　starting rising of the current to the winding wire at a time a change amount of inductance of the winding wire with respect to a change amount of a rotational angle of the rotor changes from a negative value to a positive value; and
　controlling the current applied to the winding wire such that a product of the change amount of the inductance of the winding wire with respect to the change amount of the rotational angle of the rotor and a rotational speed of the rotor is not smaller than a predetermined value and radial force of magnetic attractive force between a stator tooth and a rotor tooth is not larger than a target value.

* * * * *